US011980841B2

(12) United States Patent
Luan et al.

(10) Patent No.: US 11,980,841 B2
(45) Date of Patent: May 14, 2024

(54) TWO-SYSTEM GAS STREAM SEPARATION

(71) Applicant: International Business Machines Corporation, Armonk, NY (US)

(72) Inventors: Binquan Luan, Chappaqua, NY (US); Rodrigo Neumann Barros Ferreira, Rio de Janeiro (BR); Breanndan O'Conchuir, Warrington (GB); Fausto Martelli, Stockton Heath (GB); Ronaldo Giro, São Paulo (BR); Mathias B. Steiner, Rio de Janeiro (BR); Bruce Gordon Elmegreen, Goldens Bridge, NY (US); Tonia Elengikal, Long Island City, NY (US); Anshul Gupta, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 17/661,999

(22) Filed: May 4, 2022

(65) Prior Publication Data

US 2023/0356139 A1 Nov. 9, 2023

(51) Int. Cl.
*B01D 53/04* (2006.01)
*B01D 53/047* (2006.01)

(52) U.S. Cl.
CPC ....... *B01D 53/0446* (2013.01); *B01D 53/047* (2013.01); *B01D 2256/10* (2013.01); *B01D 2257/504* (2013.01); *B01D 2259/402* (2013.01)

(58) Field of Classification Search
CPC .............................. B01D 53/04; B01D 53/047
See application file for complete search history.

(56) References Cited

U.S. PATENT DOCUMENTS

| 5,000,925 A | 3/1991 | Krishnamurthy et al. |
| 6,170,264 B1 | 1/2001 | Viteri et al. |
| (Continued) |

FOREIGN PATENT DOCUMENTS

| CN | 103071364 B | 12/2014 |
| CN | 112452106 A | 3/2021 |
| (Continued) |

OTHER PUBLICATIONS

Fiandaca et al., "Development of a Flowsheet Design Framework of Multi-Step PSA Cycles for CO2 Capture," https://www.sciencedirect.com/science/article/abs/pii/S1570794609703621, 10th International Symposium on Process Systems Engineering—PSE2009, pp. 849-854.

(Continued)

*Primary Examiner* — Sharon Pregler
(74) *Attorney, Agent, or Firm* — Kelli Morin

(57) ABSTRACT

A gas capture system is configured to purify gas streams. The gas capture system includes a first capture system including a plurality of first chambers interconnected by a first path. Each first chamber includes a first adsorbent. The gas capture system further includes a second capture system including a plurality of second chambers interconnected by a second path. Each second chamber includes a second adsorbent. The gas capture system further includes a third path connecting each first chamber to the second path such that a first output of the first capture system is input into the second capture system. The gas capture system further includes a fourth path connecting each second chamber to the first path such that a second output of the second capture system is input into the first capture system.

14 Claims, 11 Drawing Sheets

(56) References Cited

U.S. PATENT DOCUMENTS

| | | | |
|---|---|---|---|
| 7,105,038 | B2 | 9/2006 | Lee et al. |
| 7,731,782 | B2 | 6/2010 | Kelley et al. |
| 7,927,573 | B2 * | 4/2011 | Degenstein ............. C01B 17/74 |
| | | | 423/393 |
| 8,187,469 | B2 | 5/2012 | Corma Canos et al. |
| 8,926,941 | B2 | 1/2015 | Jadhav |
| 9,023,244 | B2 | 5/2015 | Jadhav |
| 10,239,012 | B2 | 3/2019 | First et al. |
| 10,639,586 | B2 | 5/2020 | Davidian et al. |
| 11,033,852 | B2 * | 6/2021 | Nagavarapu ....... B01D 53/0462 |
| 2010/0251887 | A1 * | 10/2010 | Jain ...................... B01D 53/047 |
| | | | 95/114 |
| 2020/0001225 | A1 | 1/2020 | Ritter et al. |
| 2021/0146303 | A1 | 5/2021 | Eisenberger |
| 2021/0178324 | A1 | 6/2021 | McDonald et al. |
| 2022/0001324 | A1 | 1/2022 | Carlos M. |

FOREIGN PATENT DOCUMENTS

| | | |
|---|---|---|
| CN | 104587795 B | 10/2021 |
| FR | 2872890 A1 | 1/2006 |
| FR | 2979253 B1 | 7/2014 |

OTHER PUBLICATIONS

Fiandaca et al., "Multicriteria Design framework for CO2 capture by multi-step PSA cycles," https://www.sciencedirect.com/science/article/abs/pii/S1570794609701014, 19th European Symposium on Computer Aided Process Engineering—ESCAPE19, p. 603- © 2009 Elsevier, pp. 603-608.

Georgiadis et al., "Removal of Hydrogen Sulfide From Various Industrial Gases: A Review of the Most Promising Adsorbing Materials," https://www.mdpi.com/2073-4344/10/5/521/pdf, May 8, 2020, 36 pgs.

Muller et al., "Topological control of 3,4-connected frameworks based on the Cu2-paddle-wheel node: tbo or PTO, and why?†‡," https://pubs.rsc.org/en/content/articlelanding/2016/CE/C6CE01513A, CrystEngComm, 2016, 18, 8164, 9 pgs.

Wong-Ng et al., "Synchrotron X-ray studies of metal-organic framework M2(2,5-dihydroxyterephthalate), M = (Mn, Co, Ni, Zn) (MOF74)," https://www.cambridge.org/core/journals/powder-diffraction/article/abs/synchrotron-xray-studies-of-metalorganic-framework-m225dihydroxyterephthalate-m-mn-co-ni-zn-mof74/AF1999DE68B429C67884A84AFC53DFCF, Published online by Cambridge University Press: Nov. 30, 2012, 7 pgs.

* cited by examiner

TWO-SYSTEM GAS STREAM SEPARATION

BACKGROUND

The present disclosure relates to a system for purifying gas streams by capturing and removing particular gas species from an input gas stream. More specifically, the present disclosure describes embodiments of a gas separation system that includes two separate gas species capture systems that are cooperatively arranged and operated.

Pressure swing adsorption (PSA) is a technique used to separate some gas species from a mixture of gases under pressure according to the species' molecular characteristics and affinity for an adsorbent material. PSA operates at near-ambient temperature, and selective adsorbent materials are used as trapping material, preferentially adsorbing the target gas species at high pressure. The process then swings to low pressure to desorb the adsorbed gas.

SUMMARY

Embodiments of the present disclosure relate to a gas capture system for purifying gas streams. The gas capture system includes a first capture system including a plurality of first chambers interconnected by a first path. Each first chamber includes a first adsorbent. The gas capture system further includes a second capture system including a plurality of second chambers interconnected by a second path. Each second chamber includes a second adsorbent. The gas capture system further includes a third path connecting each first chamber to the second path such that a first output of the first capture system is input into the second capture system. The gas capture system further includes a fourth path connecting each second chamber to the first path such that a second output of the second capture system is input into the first capture system.

Other embodiments relate to a method for separating gas species of a gas stream. The method includes adsorbing molecules of a gas species onto a first adsorbent in each first capture chamber of a plurality of first capture chambers of a first capture system. The method further includes desorbing the adsorbed molecules from the first adsorbent in each first capture chamber. The method further includes moving the desorbed molecules from the first capture system into a gas stream that is input into a second capture system. The method further includes adsorbing the molecules from the gas stream onto a second adsorbent in each second capture chamber of a plurality of second capture chambers of the second capture system to generate a further gas stream. The method further includes moving the further gas stream from the second capture system into the first capture system.

Other embodiments relate to a gas capture system. The gas capture system includes a first capture system including a plurality of first capture chambers. Each first capture chamber includes a first gas capture medium configured to adsorb molecules of a gas species. The gas capture system further includes a second capture system including a plurality of second capture chambers. Each second capture chamber includes a second gas capture medium configured to adsorb molecules of the gas species. The gas capture system further includes a first path configured to move a first output of the first capture system into the second capture system. The gas capture system further includes a second path configured to move a second output of the second capture system into the first capture system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1:
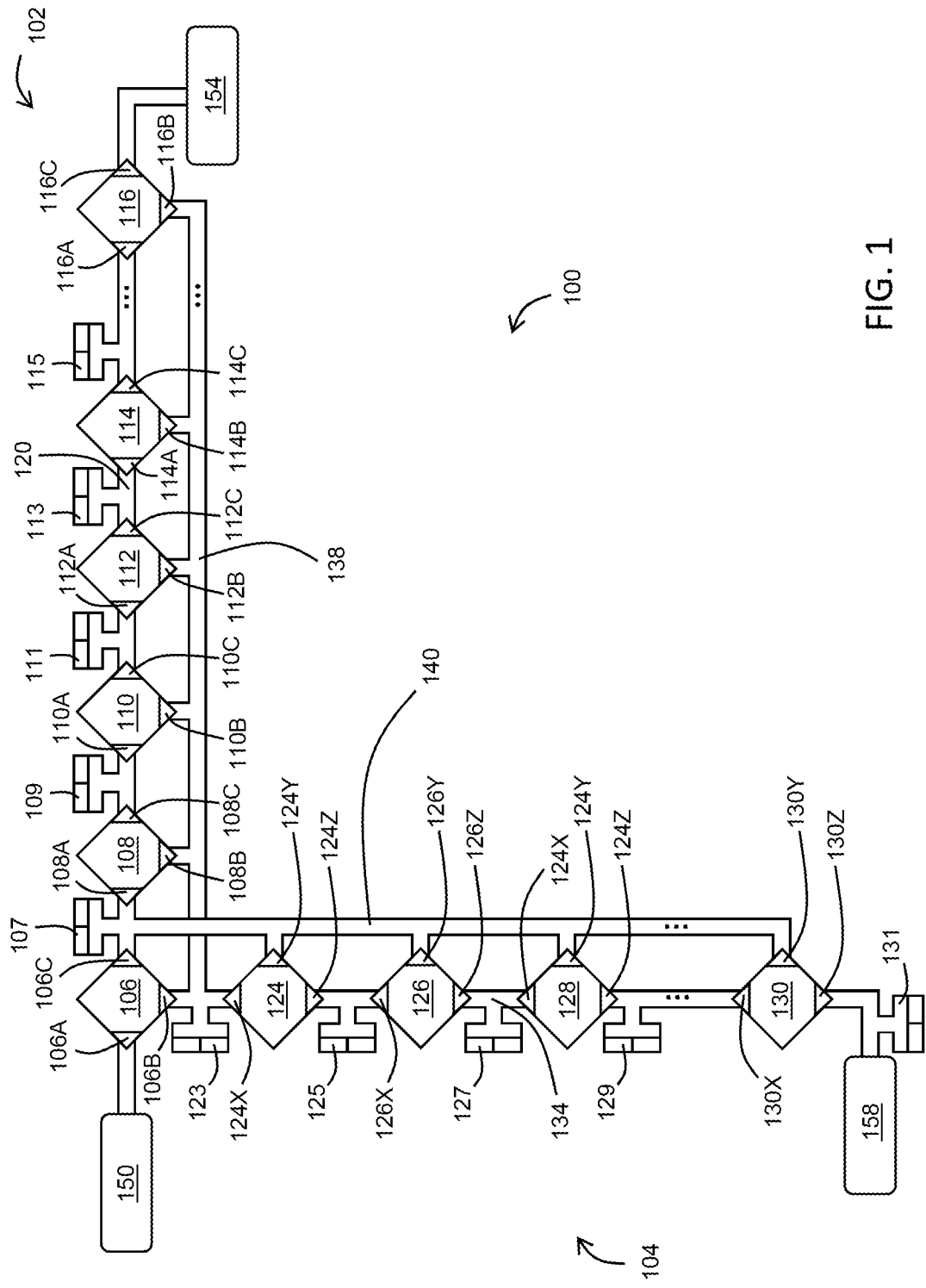
FIG. 1 illustrates an example gas separation system, in accordance with some embodiments of the present disclosure.

The present disclosure describes embodiments of a system for purifying gas streams by capturing and removing particular gas species from an input gas stream. More specifically, the present disclosure describes embodiments of a gas separation system that includes two separate gas species capture systems. The efficiency and efficacy of each of the two separate gas species capture systems are improved by the cooperative arrangement and operation of both systems.

Pressure swing adsorption (PSA) is a technique used to separate some gas species from a mixture of gases under pressure according to the species' molecular characteristics and affinity for an adsorbent material. PSA operates at near-ambient temperature, and selective adsorbent materials are used as trapping material, preferentially adsorbing the target gas species at high pressure. The process then swings to low pressure to desorb the adsorbed gas.

More specifically, under high pressure, gases tend to be trapped onto solid surfaces, which is referred to as adsorption. The higher the pressure, the more gas is adsorbed, up to the maximum capacity of the adsorbent. When the pressure is dropped, the gas is released, or desorbed from the solid surface. PSA can be used to separate gases in a mixture because different gas species are adsorbed onto a given solid surface more or less strongly. If a gas mixture, such as air, is passed under pressure through a vessel containing a bed of adsorbent material that attracts nitrogen more strongly than oxygen, a fraction of nitrogen will stay in the bed, and the gas exiting the vessel will have a higher oxygen concentration than the mixture entering the vessel. When the bed reaches the limit of its capacity to adsorb nitrogen, it can be regenerated by decreasing the pressure, thus releasing the adsorbed nitrogen. It is then ready for another cycle of producing oxygen-enriched air.

Using multiple adsorbent vessels enables near-continuous production of the target gas, because one vessel can be depressurized for desorption and regeneration while another vessel is being pressurized for adsorption. It also allows a pressure equalization, where the gas leaving a first vessel being depressurized is used to partially pressurize a second vessel. This results in significant energy savings.

Aside from their ability to discriminate between different gases, adsorbents for PSA systems are usually very porous materials chosen because of their large specific surface areas. Though the gas adsorbed on these surfaces may consist of a layer only one or at most a few molecules thick, surface areas of several hundred square meters per gram enable the adsorption of a large portion of the adsorbent's weight in gas. In addition to their affinity for different gases, some types of adsorbents may act as a molecular sieve to exclude some gas molecules from their structure based on the size and shape of the molecules relative to the size and shape of the adsorbent's pores, thereby restricting the ability of larger molecules to be adsorbed. Typically, the lower the selectivity of the adsorbent material, the larger the pore size, and the higher the selectivity of the adsorbent material, the smaller the pore size.

Microporous or nanoporous materials are commonly used as selective adsorbent materials for PSA. Examples of such materials include zeolites, activated carbon, and metal-organic frameworks (MOFs). MOFs are a class of compounds consisting of metal ions coordinated to organic ligands to form one-, two-, or three-dimensional structures. MOFs are a subclass of coordination polymers, with the special feature that they are often porous. Those MOFs which are used in a PSA typically have pores which remain substantially structurally stable during desorption of the adsorbed gas and can then be refilled in another PSA cycle.

Accordingly, such materials can be used, for example, as solid sorbents of $CO_2$ and other greenhouse gases from flue gas streams output from point source emitters. In such applications, the $CO_2$ composition is typically in a range of approximately 12-15% for coal-fired flue gas streams and in a range of approximately 7-10% for natural gas-fired flue gas streams. The flue gas component with the highest concentration is $N_2$, which typically makes up approximately 70%, or more, of the flue gas.

The success of a $CO_2$ capture process depends strongly on the $CO_2/N_2$ selectivity of the selective adsorbent material. Currently, the US Department of Energy target for carbon capture is to remove 90% of the carbon content from a gas stream.

One strategy for increasing the percentage of carbon removed from the gas stream in PSA systems is to use adsorbents with extremely high selectivity. However, in some cases, the cost of selective adsorbent materials increases with selectivity. Accordingly, systems using such highly-selective adsorbents may be cost-prohibitive from a practical standpoint. Additionally, highly selective MOFs typically have very small pores, which slows the adsorption process.

Embodiments of the present disclosure may overcome these and other drawbacks of PSA by including two separate capture systems, each utilizing a number of successive chambers to increase selectivity. As described in further detail below, an output of a first of the capture systems is input into the second capture system, and an output of the second capture system is input into the first capture system to optimize the efficiency of each system. Accordingly, embodiments of the present disclosure enable usage of adsorbents having a low-selectivity but a large accessible volume in a multi-stage PSA array. In other words, embodiments of the present disclosure enable optimization of a multi-stage PSA process and adsorbent selection.

As described in further detail below, embodiments of the present disclosure are utilized to separate $CO_2$ and $N_2$ from a gas stream that has been pre-processed to remove substantially all other gas species and impurities. In other words, the gas stream that is input into the disclosed gas capture system substantially only includes $CO_2$ and $N_2$. This may be referred to as a binary gas mixture. In alternative embodiments, the disclosed gas capture system can be used to separate other gas streams or binary gas mixtures that include two different gas species. The separation of $CO_2$ and $N_2$ is described herein as an illustrative example.

More specifically, embodiments of the present disclosure optimize the carbon capture process by enhancing the $CO_2/N_2$ selectivity of the overall system via the cooperative operation of the first and second capture systems. $CO_2/N_2$ selectivity demonstrates an interesting behavior as a function of pressure as the $CO_2$ concentration in the flue gas increases. In particular, for $CO_2$-rich flue gases, the $CO_2/N_2$ selectivity peaks at a certain pressure, typically greater than 1 bar. Embodiments of the present disclosure employ an iterative, multi-step carbon capture process that achieves high-purity $CO_2$ by feeding the output of the first capture system into the second capture system, utilizing the increased selectivity that results from the increase in $CO_2$.

Embodiments of the present disclosure enable both the output of high purity $CO_2$ from the second capture system and the recovery of a high fraction of the total $CO_2$ from the second capture system. Typically, these two outcomes anti-correlate, but embodiments of the present disclosure prevent loss or leakage of gas between the first capture system and the second capture system. Because the purity of $CO_2$ is high at the end of the second capture system, virtually no $N_2$ is being output from the gas separation system via the second capture system. Instead, virtually all of the $N_2$ is being output from the gas separation system via the first capture system. Similarly, virtually no $CO_2$ is being output from the gas separation system via the first capture system, and virtually all of the $CO_2$ is being output from the gas separation system via the second capture system. Accordingly, embodiments of the present disclosure enable the correlation of high purity and high recovery fraction for both gas types. Notably, the output of each capture system is nearly purely the respective gas type.

It is to be understood that the aforementioned advantages are example advantages and should not be construed as limiting. Embodiments of the present disclosure can contain all, some, or none of the aforementioned advantages while remaining within the spirit and scope of the present disclosure.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Referring now to the drawings, in which like numerals represent the same or similar elements, FIG. 1 illustrates an example gas separation system 100, including a first capture system 102 and a second capture system 104. As described in further detail below, an output of the first capture system 102 is input into the second capture system 104, and an output of the second capture system 104 is input into the first capture system 102.

More specifically, the first capture system 102 includes a plurality of first capture chambers 106, 108, 110, 112, 114, and 116 interconnected by a first path 120. Each first capture chamber contains a first adsorbent. In accordance with at least one embodiment of the present invention, the first adsorbent can be a MOF. However, in alternative embodiments, other adsorbents may also be used. In accordance with at least one embodiment of the present disclosure, the first adsorbent can have a relatively high-selectivity. For example, the first adsorbent can have a selectivity of approximately 100. In accordance with at least one embodiment of the present disclosure, the first adsorbent can be selective for carbon dioxide. Accordingly, in such embodiments, carbon dioxide is adsorbed to the first adsorbent in each of the first chambers 106, 108, 110, 112, 114, and 116 such that carbon dioxide is selectively removed from the gas stream that passes through the first capture system 102.

In accordance with at least one alternative embodiment, filters can be used in each of the first capture chambers instead of adsorbents. In such embodiments, the filters will act as molecular sieves or membranes, excluding molecules by size or a combination of size and chemical affinity, rather than adsorbing particular species of molecules. Accordingly, embodiments of the present disclosure may include a gas capture medium in each capture chamber. Non-limiting examples of gas capture media include MOFs, zeolites, activated carbon or other adsorbents, and sieving filters or membranes.

The first capture system 102 shown in the example gas separation system 100 includes six first capture chambers, but alternative embodiments may include more or fewer first capture chambers interconnected by the first path 120. The ellipsis in the first path 120 indicates that additional first capture chambers could be added, for example, between first capture chamber 114 and first capture chamber 116. Ultimately, the number of first capture chambers can be selected based on how many first capture chambers the gas stream must pass through to reach the desired composition.

Similarly, the second capture system 104 includes a plurality of second capture chambers 124, 126, 128, and 130 interconnected by a second path 134. Each second capture chamber contains a second adsorbent. In accordance with at least one embodiment of the present invention, the second adsorbent can be a MOF. However, in alternative embodiments, other adsorbents may also be used. In accordance with at least one embodiment of the present disclosure, the second adsorbent can be a relatively low-selectivity adsorbent. In other words, the second adsorbent can have a lower selectivity than the first adsorbent. For example, the second adsorbent can have a selectivity of approximately 10. In accordance with alternative embodiments, the second adsorbent can have the same selectivity or a higher selectivity than the first adsorbent. However, the ability to use a lower selectivity adsorbent for the second adsorbent may result in greater efficiency and/or cost savings.

In accordance with at least one embodiment of the present disclosure, the second adsorbent can be selective for carbon dioxide. Accordingly, in such embodiments, carbon dioxide is adsorbed to the second adsorbent in each of the second chambers 124, 126, 128, and 130 such that carbon dioxide is selectively removed from the gas stream that passes through the second capture system 104.

In accordance with at least one alternative embodiment, filters or membranes can be used in each of the second capture chambers instead of adsorbents. In such embodiments, the filters or membranes will exclude molecules by size or a combination of chemical affinity and size, respectively, rather than adsorbing particular species of molecules. Accordingly, embodiments of the present disclosure may include a gas capture medium in each capture chamber.

Non-limiting examples of gas capture media include MOFs, zeolites, activated carbon and other adsorbents, and filters and membranes.

The second capture system 104 shown in the example gas separation system 100 includes four second capture chambers, but alternative embodiments may include more or fewer second capture chambers interconnected by the second path 134. The ellipsis in the second path 134 indicates that additional second capture chambers could be added, for example, between second capture chamber 128 and second capture chamber 130. Ultimately, the number of second capture chambers can be selected based on how many second capture chambers the gas stream must pass through to reach the desired composition.

Each first capture chamber 106, 108, 110, 112, 114, and 116 includes a first valve, a second valve, and a third valve. The first valve of each first capture chamber is referred to by appending an A to the corresponding first capture chamber reference numeral. For example, the first valve of the first capture chamber 106 is referred to as 106A. Likewise, the second valve of each first capture chamber is referred to by appending a B to the corresponding first capture chamber reference numeral, and the third valve of each first capture chamber is referred to by appending a C to the corresponding first capture chamber reference numeral.

Similarly, each second capture chamber 124, 126, 128, and 130 includes a first valve, a second valve, and a third valve. The first valve of each second capture chamber is referred to by appending an X to the corresponding second capture chamber reference numeral. For example, the first valve of the second capture chamber 124 is referred to as 124X. Likewise, the second valve of each second capture chamber is referred to by appending a Y to the corresponding second capture chamber reference numeral, and the third valve of each second capture chamber is referred to by appending a Z to the corresponding second capture chamber reference numeral.

The gas separation system 100 further includes a third path 138 connecting each of the first capture chambers 106, 108, 110, 112, 114, and 116 and the second path 134 such that, as described in further detail below, an output of the first capture system 102 is input into the second capture system 104. Similarly, the gas separation system 100 further includes a fourth path 140 connecting each of the second capture chambers 124, 126, 128, and 130 and the first path 120 such that, as described in further detail below, an output of the second capture system 104 is input into the first capture system 102.

The first and third valves A and C of each first capture chamber connect the first capture chambers to the first path 120. In other words, if the first and third valves of each first capture chamber are open, gas can flow freely through the first path 120. The second valve B of each first capture chamber connects each first capture chamber to the third path 138 and, therefore, to the second path 134. Similarly, the first and third valves X and Z of each second capture chamber connect the second capture chambers to the second path 134 such that if the first and third valves of each second capture chamber are open, gas can flow freely through the second path 134. The second valve Y of each second capture chamber connects each second capture chamber to the fourth path 140 and, therefore, to the first path 120.

The gas separation system 100 further includes a plurality of pumps configured to drive the gas through the first and second capture systems 102, 104. In accordance with embodiments of the present disclosure, the pumps can be configured as piston-type pumps. Regardless of the particular type of pump, each pump is configured to draw in and contain gas when expanded and force gas out when contracted.

In the embodiment shown in FIG. 1, the first capture system 102 includes a first pump connected to the first path 120 between each of the first capture chambers 106, 108, 110, 112, 114, and 116. In particular, the first capture system 102 includes a first pump 107 connected to the first path 120 immediately downstream of the first capture chamber 106, a first pump 109 connected to the first path 120 immediately downstream of the first capture chamber 108, a first pump 111 connected to the first path 120 immediately downstream of the first capture chamber 110, a first pump 113 connected to the first path 120 immediately downstream of the first capture chamber 112, and a first pump 115 connected to the first path 120 immediately downstream of the first capture chamber 114.

Notably, the fourth path 140 is connected to the first path 120 between the first capture chamber 106 and the first capture chamber 108. Accordingly, the first pump 107 that is arranged between the first capture chamber 106 and the first capture chamber 108 is also connected to the fourth path 140.

Similarly, in the embodiment shown in FIG. 1, the second capture system 104 includes a second pump connected to the second path 134 between each of the second capture chambers 124, 126, 128, and 130 as well as between the second capture chamber 124 and the first capture chamber 106 and as well as downstream of the second capture chamber 130. In particular, a second pump 123 is arranged between first capture chamber 106 and the second capture chamber 124 such that the second pump 123 is connected to the second path 134 immediately upstream of the second capture chamber 124. A second pump 125 is connected to the second path 134 immediately downstream of the second capture chamber 124. A second pump 127 is connected to the second path 134 immediately downstream of the second capture chamber 126, and a second pump 129 is connected to the second path 134 immediately downstream of the second capture chamber 128. Additionally, a second pump 131 is connected to the second path 134 immediately downstream of the second capture chamber 130.

Notably, the third path 138 is connected to the second path 134 between the first capture chamber 106 and the second capture chamber 124. Accordingly, the second pump 123 that is arranged between the first capture chamber 106 and the second capture chamber 124 is also connected to the third path 138.

The gas separation system 100 further includes a gas stream input 150, which provides a gas stream to the gas separation system 100 to be separated. In accordance with at least one embodiment of the present disclosure, the gas stream input 150 can provide a gas stream from ambient air. In accordance with at least one embodiment of the present disclosure, the gas stream input 150 can provide a gas stream from a coal-fired or natural gas-fired flue. In such embodiments, the gas stream can be processed to remove impurities such as, for example, $H_2O$ and $H_2S$ prior to entering the gas separation system 100 at the gas stream input 150. In other alternative embodiments, the gas stream input 150 can provide a gas stream from another source.

The gas separation system 100 further includes a first capture system output 154 configured to output gas that has moved through the first capture system 102 and is not moved into the second capture system 104, as described in further detail below. In accordance with at least one embodiment of the present disclosure, the first capture system output 154 can release the gas into the atmosphere. In accordance with at least one embodiment of the present disclosure, the first capture system output 154 can output the gas that has moved through the first capture system 102 into a storage container (not shown).

Similarly, the gas separation system 100 further includes a second capture system output 158 configured to output gas that has moved through the second capture system 104 and is not moved into the first capture system 102, as described in further detail below. In accordance with at least one embodiment of the present disclosure, the second capture system output 158 can output the gas that has moved through the second capture system 104 into a storage container (not shown).

Figure 2:
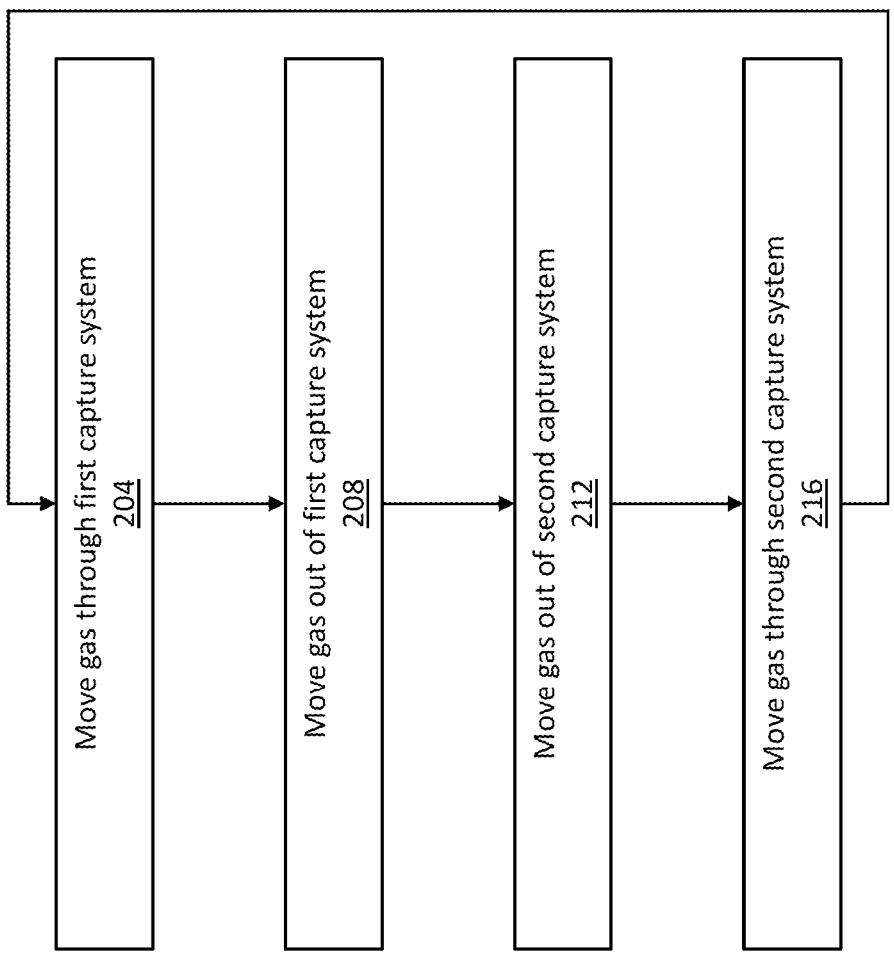
FIG. 2 depicts a flowchart of a method for separating gas that can be performed using the gas separation system shown in FIG. 1, in accordance with some embodiments of the present disclosure.

FIG. 2 depicts a flowchart of an example method 200 for separating a gas stream that can be performed using the gas separation system 100 shown in FIG. 1. The method 200 begins with operation 204, wherein a gas stream is moved through a first capture system. In accordance with at least one embodiment of the present disclosure, performance of operation 204 may include the performance of a number of sub-operations.

In accordance with at least some embodiments of the present disclosure, the performance of operation 204 includes moving the gas through a first subset of the first capture chambers and then, subsequently, moving the gas through a second subset of the first capture chambers. Notably, each first capture chamber of the first subset is separated from one another by a first capture chamber of the second subset. In other words, first capture chambers of the first subset and first capture chambers of the second subset are arranged in an alternating pattern with one another. Additionally, none of the first capture chambers included the first subset is included in the second subset, and none of the first capture chambers included in the second subset is included in the first subset.

To enable the gas to be moved through the first subset of first capture chambers, the first and third valves of each of the first capture chambers of the first subset are opened and all other valves of the first capture system are closed. Thus, the second valves of each of the first capture chambers of the first subset are closed and all valves of the first capture chambers of the second subset are also closed.

To move the gas through the first subset of the first capture chambers, the first pump arranged immediately downstream of each of the first capture chambers of the first subset are expanded and all other first pumps are contracted. The contraction and expansion of the first pumps moves gas through the open valves of the first subset of the first capture chambers, thereby passing it over the first adsorbents in the first subset of first capture chambers.

Figure 3:
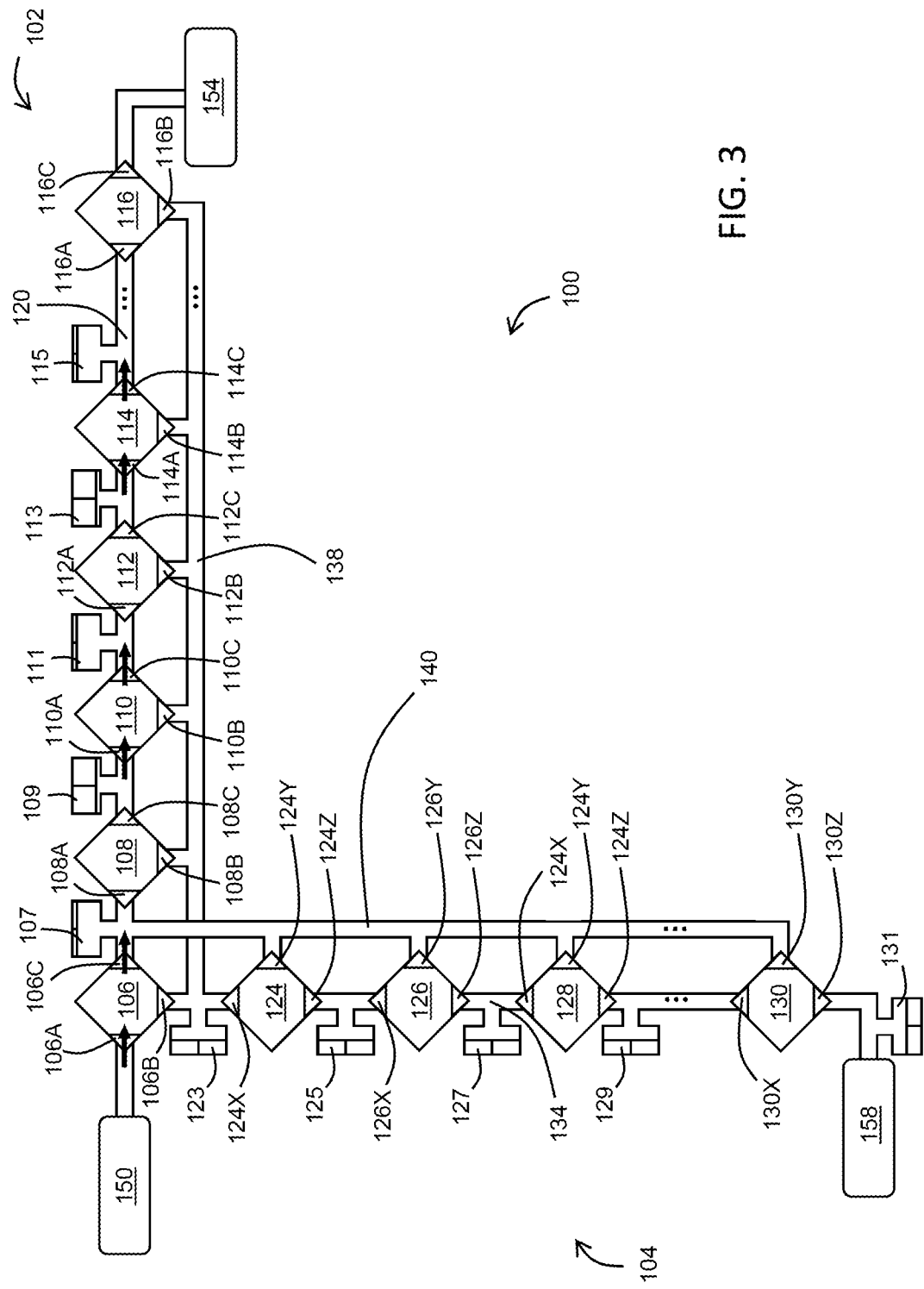
FIG. 3 illustrates the performance of a portion of the method shown in FIG. 2 using the gas separation system shown in FIG. 1, in accordance with some embodiments of the present disclosure.

FIG. 3 illustrates the performance of this portion of operation 204 in the context of the gas separation system 100. The arrows shown in FIG. 3 illustrate the movement of gas through the gas separation system 100 during the performance of this portion of operation 204. In the example gas separation system 100, the first capture chambers 106, 110, and 114 are included in the first subset of first capture chambers, and the first capture chambers 108, 112, and 116 are included in the second subset of first capture chambers.

First, to enable the gas to be moved through the first subset of first capture chambers, the first and third valves A and C of each first capture chamber of the first subset are opened. In other words, valves 106A, 106C, 110A, 110C, 114A, and 114C are opened. All other valves in the first capture system 102 are closed. In other words, valves 106B, 108A-C, 110B, 112A-C, 114B, and 116A-C are closed.

To move the gas through the first subset of first chambers, the first pump 107 between first capture chamber 106 and first capture chamber 108 is expanded, the first pump 111 between first capture chamber 110 and first capture chamber 112 is expanded, and the first pump 115 between first capture chamber 114 and 116 is expanded. Additionally, the first pump 109 between first capture chamber 108 and first capture chamber 110 is contracted, and the first pump 113 between first capture chamber 112 and first capture chamber 114 is contracted. The concurrent expansion and contraction of the first pumps moves the gas through the open valves 106A, 106C, 110A, 110C, 114A, and 114C and along the first path 120. The gas that moves through each of the first capture chambers of the first subset passes over the first adsorbent in the first capture chamber, and carbon dioxide is adsorbed from the gas onto the first adsorbents of the first subset of first capture chambers.

More specifically, the expansion of first pump 107 draws gas from the gas stream input 150 through the first capture chamber 106, and over the first adsorbent therein, and into the first pump 107. The contraction of first pump 109 and the expansion of first pump 111 move gas from the first pump 109 through the first capture chamber 110, and over the first adsorbent therein, and into the first pump 111. The contraction of first pump 113 and the expansion of first pump 115 move gas from the first pump 113 through the first capture chamber 114, and over the adsorbent therein, and into the first pump 115.

Next, to enable the gas to be moved through the second subset of first capture chambers, the first and third valves of each of the first capture chambers of the second subset are opened and all other valves of the first capture system are closed. Thus, the second valves of each of the first capture chambers of the second subset are closed and all valves of the first capture chambers of the first subset are also closed.

To move the gas through the second subset of the first capture chambers, the first pump arranged immediately downstream of each of the first capture chambers of the second subset are expanded and all other first pumps are contracted. The contraction and expansion of the first pumps moves gas through the open valves of the second subset of the first capture chambers, thereby passing it over the first adsorbents in the second subset of first capture chambers.

Figure 4:
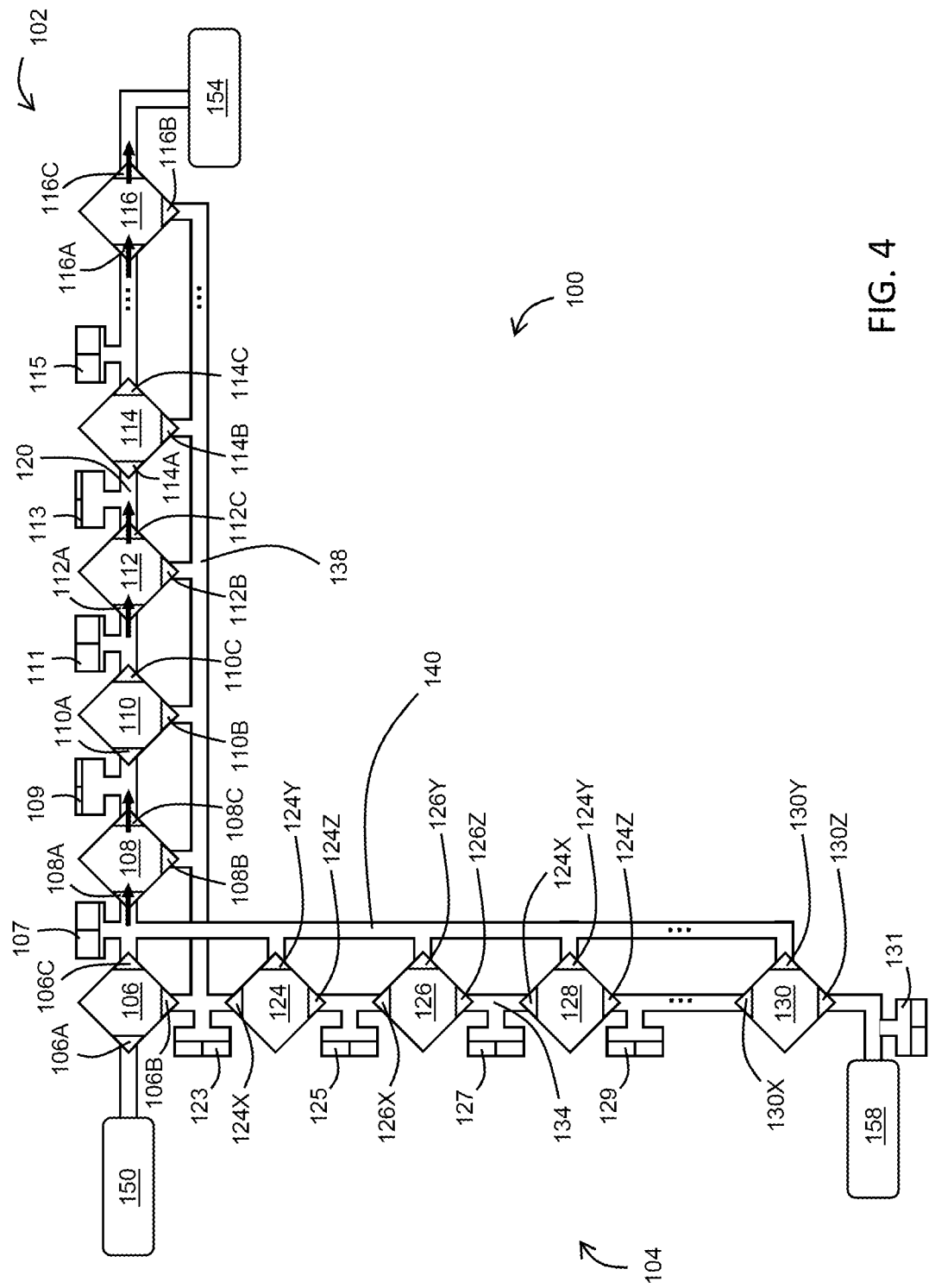
FIG. 4 illustrates the performance of a portion of the method shown in FIG. 2 using the gas separation system shown in FIG. 1, in accordance with some embodiments of the present disclosure.

FIG. 4 illustrates the performance of this portion of operation 204 in the context of the gas separation system 100. The arrows shown in FIG. 4 illustrate the movement of gas through the gas separation system 100 during the performance of this portion of operation 204.

First, to enable the gas to be moved through the second subset of first capture chambers, the first and third valves A and C of each first capture chamber of the second subset are opened. In other words, valves 108A, 108C, 112A, 112C, 116A, and 116C are opened. All other valves in the first capture system 102 are closed. In other words, valves 106A-C, 108B, 110A-C, 112B, 114A-C, and 116B are closed.

To move the gas through the second subset of first chambers, the first pump 109 between first capture chamber 108, and first capture chamber 110 is expanded, and the first pump 113 between first capture chamber 112 and first capture chamber 114 is expanded. Additionally, the first pump 107 between first capture chamber 106 and first capture chamber 108 is contracted, the first pump 111 between first capture chamber 110 and first capture chamber 112 is contracted, and the first pump 115 between first capture chamber 114 and first capture chamber 116 is contracted. The concurrent expansion and contraction of the first pumps moves the gas through the open valves 108A, 108C, 112A, 112C, 116A, and 116C and along the first path 120. The gas that moves through each of the first capture chambers of the second subset passes over the first adsorbent in the first capture chamber, and carbon dioxide is adsorbed from the gas onto the first adsorbent.

More specifically, the contraction of first pump 107 and the expansion of first pump 109 move gas from the first pump 107 through the first capture chamber 108, and over the first adsorbent therein, and into the first pump 109. The contraction of the first pump 111 and the expansion of first pump 113 move gas from the first pump 111 through the first capture chamber 112, and over the first adsorbent therein, and into the first pump 113. The contraction of the first pump 115 moves gas from the first pump 115 through the first capture chamber 116, and over the first adsorbent therein, and into the first capture system output 154.

During the performance of operation 204, gas is moved through the first capture system with very little need for added energy, because the pressure remains substantially constant at approximately 40 atmospheres. In alternative embodiments, the pressure can be substantially constant at another pressure that is greater than or less than approximately 40 atmospheres so long as the pressure is sufficiently high to enable effective and efficient adsorption in the PSA operation.

As the gas moves through the first capture system, carbon dioxide is adsorbed to the first adsorbent in each of the first capture chambers. Therefore, the gas that is drawn through each of the first capture chambers by the expansion of the first pump that is immediately downstream of each of the first capture chambers has a lower concentration of carbon dioxide. For embodiments wherein the gas stream has already been purified into a mixture of carbon dioxide and nitrogen, gas that is pulled into each expanded first pump has a higher concentration of nitrogen than gas that has not yet passed through the first capture chamber immediately upstream of that expanded first pump.

During initial operation of the gas separation system, before gas has been moved into and/or through each of the first capture chambers, there is no gas to be moved other than from the gas stream input into the first of the first capture chambers. Accordingly, in such instances, during the performance of operation 204, gas is moved only through one first capture chamber at a time. In such instances, moving the gas through the first and second subsets of first capture chambers may be repeated several times before gas has been moved into each of the first capture chambers and therefore moved through each of the first capture chambers during the performance of operation 204.

Once gas is present in each first capture chamber, each performance of operation 204 moves gas through the next two downstream first capture chambers (one in the first subset and then one in the second subset) and into the next two downstream first pumps. Thus, each performance of operation 204 moves the gas stream past two first adsorbents, thereby leaving carbon dioxide adsorbed to the first adsorbents in each of the first capture chambers and moving gas having a continuously higher nitrogen concentration into each of the first pumps.

Accordingly, in the embodiment shown in FIG. 4, at the conclusion of the performance of operation 204, each of the expanded first pumps 109 and 113 contains gas that has a high concentration of nitrogen. Additionally, each of the first expanded first pumps 109 and 113 contains a low concentration of carbon dioxide that has not yet been filtered out. Conversely, each of the first capture chambers contains a high concentration of carbon dioxide that is adsorbed to the first adsorbents as well as a low concentration of nitrogen that is incidentally trapped by the first adsorbents.

During successive performances of operation 204 during successive cycles of the method 200, the nitrogen concentration of gas in the first capture system continues to increase as gas is moved further downstream, and therefore through more first capture chambers and past more first adsorbents. Thus, at the conclusion of the performance of operation 204, once all of the first pumps and first chambers have been filled with gas, gas having the highest concentration of nitrogen is moved through the most downstream first capture chamber and into the first capture system output. As noted above, the first capture system output is configured to output gas that has moved through the first capture system and is not moved into the second capture system.

In other words, during the performance of operation 204 in each successive cycle of the method 200, nitrogen-rich gas moves further downstream, and therefore through a greater number of first capture chambers containing first adsorbents, becoming increasingly nitrogen-rich. Accordingly, the gas in the first pump 109 immediately downstream of the first capture chamber 108 has a higher concentration of nitrogen (and a lower concentration of carbon dioxide) than the gas in the first pump 107 immediately downstream of the first capture chamber 106. Similarly, the gas in the pump 115 immediately downstream of the first capture chamber 114 has a higher concentration of nitrogen than the gas in the first pump 113 immediately downstream of the first capture chamber 112. Therefore, each performance of operation 204 results in higher concentrations of nitrogen in the gas that is moved into each subsequent downstream first pump.

By the time the gas reaches the first capture chamber 116, the composition of the gas has reached a target. In particular, in accordance with embodiments of the present disclosure, the gas at the first capture chamber 116 has a concentration of nitrogen that has been increased to a desired percentage. For example, in one embodiment, gas that has passed through the first capture chamber 116 has reached 99.9% nitrogen purity. Thus, the performance of operation 204 includes moving that gas through the last first capture chamber 116 and into the first capture system output 154.

In accordance with one embodiment of the present disclosure, the first capture system output 154 can simply release the nitrogen-rich gas into the atmosphere. In accordance with at least one alternative embodiment of the present disclosure, the first capture system output 154 can output the nitrogen-rich gas into a storage container (not shown). Because the gas separation system 100 enables the production of such high purity nitrogen-rich gas, the first capture system output 154 outputs gas that is pure enough to be used for secondary purposes. For example, the first capture system output 154 can output gas to be stored and, subsequently, repurposed for high-grade $N_2$ products.

Returning to FIG. 2, following the performance of operation 204, the method 200 proceeds with the performance of operation 208, wherein gas is moved out of the first capture system. In accordance with at least one embodiment of the present disclosure, performance of operation 208 may include the performance of a number of sub-operations.

Moving gas out of the first capture system includes moving carbon dioxide-rich gas into the second capture system. More specifically, carbon dioxide-rich gas is moved out of the first capture system by reducing the pressure in the first capture chambers to desorb carbon dioxide from the first adsorbents in the first capture system and moving the desorbed carbon dioxide into a gas stream that is moved into the second capture system. In particular, the performance of operation 208 includes opening the second valve of each of the first capture chambers, closing the first and third valves of each of the first capture chambers, and expanding a second pump to reduce pressure in a third path which is connected to the second capture system, thereby drawing the carbon dioxide-rich gas from the first capture chambers into the third path and into the second capture system.

Figure 5:
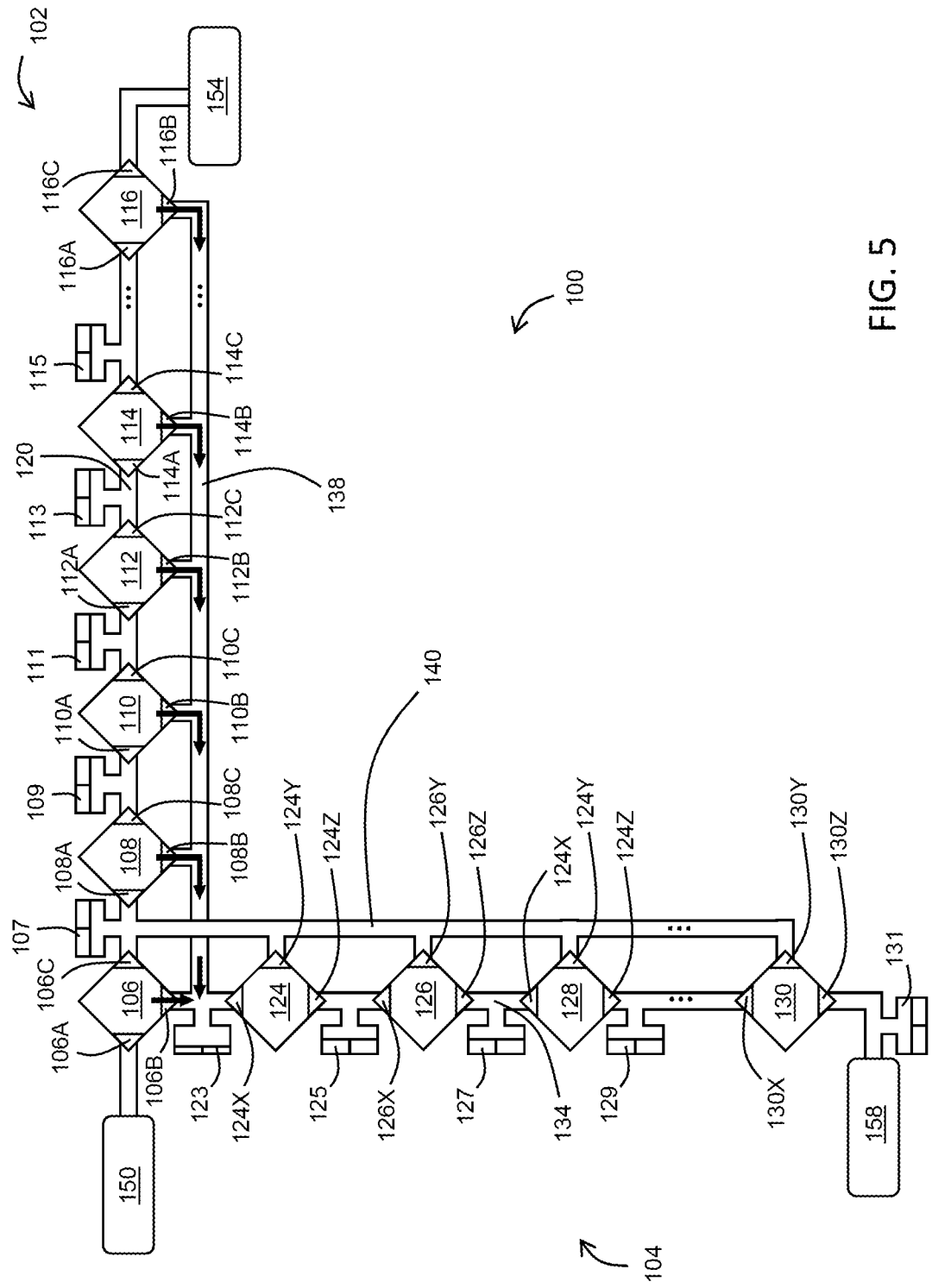
FIG. 5 illustrates the performance of a portion of the method shown in FIG. 2 using the gas separation system shown in FIG. 1, in accordance with some embodiments of the present disclosure.

FIG. 5 illustrates the performance of operation 208 in the context of the gas separation system 100. The arrows shown in FIG. 5 illustrate the movement of gas through the gas separation system 100 during the performance of operation 208.

First to enable carbon dioxide-rich gas to be moved out of the first capture system 102, the second valves 106B, 108B, 110B, 112B, 114B, and 116B are all opened to establish fluid connection between each of the first capture chambers 106, 108, 110, 112, 114, and 116 and the third path 138. The first valve X of each second capture chamber 124, 126, 128, and 130 is closed, and the first and third valves A and C of each first capture chamber 106, 108, 110, 112, 114, and 116 are closed.

To move the gas out of the first capture system 102 and into the second capture system 104, the second pump 123 between the first capture chamber 106 and the second capture chamber 124 is expanded. Accordingly, the reduction in pressure in the third path 138 caused by the expansion of the second pump 123 desorbs the carbon dioxide from the first adsorbent in each of the first capture chambers 106, 108, 110, 112, 114, and 116 and draws the resulting carbon dioxide-rich gas into the second pump 123 and therefore into the second path 134 and the second capture system 104.

At the conclusion of the performance of operation 208, all of the carbon dioxide-rich gas that has been withdrawn from the first capture system 102 is being held in the expanded second pump 123. Accordingly, the second pump 123 may have a larger volume than the other second pumps in the second capture system 104. In other words, the second pump 123 is not necessarily shown to scale in the example gas separation system 100.

Returning to FIG. 2, following the performance of operation 208, the method 200 proceeds with the performance of operation 212, wherein gas is moved out of the second capture system. In accordance with at least one embodiment of the present disclosure, performance of operation 212 may include the performance of a number of sub-operations.

First, to enable the gas to be moved out of the second capture chambers, the second valve of each of the first capture chambers is closed. Accordingly, subsequent contraction of the second pump that is in connection with the third path will force gas through the second path and the second capture chambers instead of back through the first capture system.

Next, each of the second pumps is partially contracted to move gas from each of the second pumps into each of the second capture chambers and to equilibrate pressure within the gas separation system. Notably, the gas that is moved into each of the second capture chambers is relatively high in carbon dioxide, because it includes the desorbed carbon dioxide from the first capture system. Accordingly, as noted above, the second adsorbents can have a relatively low carbon dioxide selectivity, because they are being used for gas that has a relatively high carbon dioxide concentration.

Next, the first and second valves of each of the second capture chambers are opened and the third valve of each of the second capture chambers is closed. This establishes a fluid connection from each second pump through the immediately downstream second capture chamber and into the fourth path.

Finally, each of the second pumps is further contracted to move gas through the respective immediately downstream second capture chamber, and over the second adsorbent therein, and through the fourth path to the first path. Additionally, the further contraction of the second pumps results in each second capture chamber being filled at high pressure, facilitating adsorption of carbon dioxide to the second adsorbents therein. Additionally, the first pump that is connected to the fourth path is expanded to facilitate moving the gas out of the second capture system and into the first capture system.

As the gas is moved into and through the second capture chambers, carbon dioxide is adsorbed onto the second adsorbents therein. Accordingly, the gas that is moved into the fourth path and to the first path in the performance of operation 212 has a higher nitrogen concentration (and a lower carbon dioxide concentration) than the gas that was moved into the second path. Accordingly, as noted above, the first adsorbents have a relatively high carbon dioxide selectivity, because they are being used for gas that has a relatively low carbon dioxide concentration.

Notably, the second pumps and the second capture chambers will initially be empty of gas until the method 200 has been performed enough times that gas is forced sequentially into and through each of the second pumps and second capture chambers. Accordingly, during initial performances of operation 212, some of the second pumps will not have any gas to force through respective immediately downstream second capture chambers. At a minimum, during the first performance of operation 212, gas will be moved through one second pump and one second capture chamber.

Figure 6:
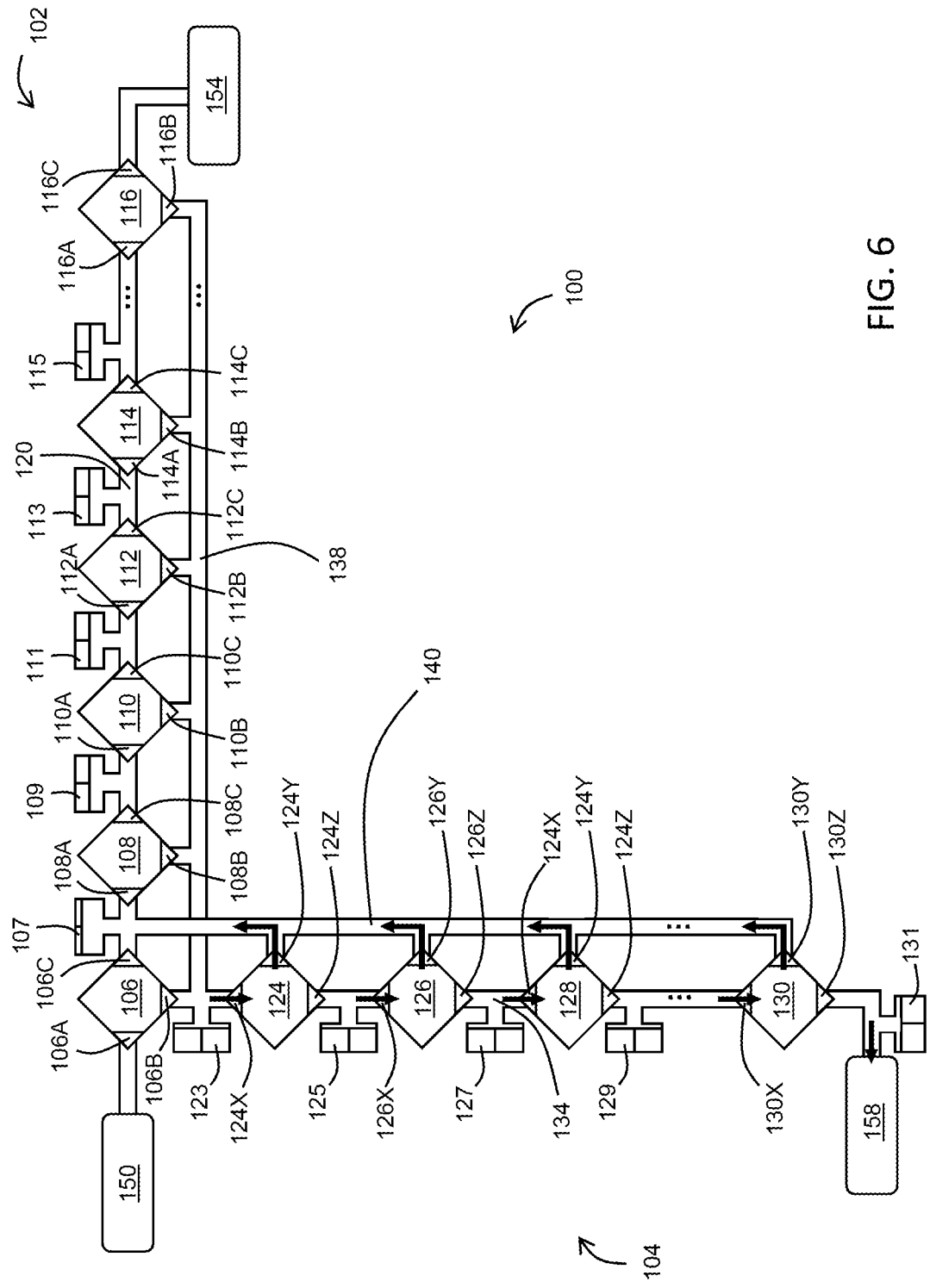
FIG. 6 illustrates the performance of a portion of the method shown in FIG. 2 using the gas separation system shown in FIG. 1, in accordance with some embodiments of the present disclosure.

FIG. 6 illustrates the performance of operation 212 in the context of the gas separation system 100. The arrows shown in FIG. 6 illustrate the movement of gas through the gas separation system 100 during the performance of operation 212.

First, to enable the gas to be moved out of the second capture chambers 124, 126, 128, and 130 and into the fourth path 140, the second valves 106B, 108B, 110B, 112B, 114B, and 116B are closed. Next, the second pumps 123, 125, 127, 129, and 131 are partially contracted. Next, the first and second valves 124X, 124Y, 126X, 126Y, 128X, 128Y, 130X, and 130Y are opened, and the third valves 124Z, 126Z, 128Z, and 130Z are closed. Finally, each of the second pumps 123, 125, 127, 129, and 131 is further contracted and the first pump 107 is expanded, moving gas through each of the second capture chambers 124, 126, 128, and 130 and through the fourth path 140, out of the second capture system 104 and into the first pump 107 and the first path 120.

Notably, because the second pump 131 is arranged immediately downstream of the second capture chamber 130, the contraction of second pump 131 moves gas from the second pump 131 into the second capture system output 158 rather than into the fourth path 140.

As noted above, during initial performances of operation 212, some of the second pumps will not have any gas to force through respective immediately downstream second capture chambers. At a minimum, during the first performance of operation 212, gas will be moved from the second pump 123 through the second capture chamber 124. As described in further detail below, during the performance of a subsequent operation of the method 200, gas is moved into the next downstream second pump 125. Therefore, during the following performance of operation 212 during the following cycle of the method 200, gas will be moved from the second pumps 123 and 125 and through the second capture chambers 124 and 126. Eventually, each second pump and each second capture chamber will contain gas from the previous cycle of the method 200.

At the conclusion of the performance of operation 212, all of the nitrogen-rich gas that has been withdrawn from the second capture system 104 is being held in the expanded first pump 107. Accordingly, the first pump 107 may have a larger volume than the other first pumps in the first capture system 102. In other words, the first pump 107 is not necessarily shown to scale in the example gas separation system 100.

Additionally, at the conclusion of the performance of operation 212, carbon dioxide has been adsorbed to each second adsorbent within each second capture chamber under the high pressure generated by contracting all of the second pumps.

Accordingly, in the embodiment shown in FIG. 6, at the conclusion of the performance of operation 212, the expanded first pump 107 contains gas that has a high concentration of nitrogen. Additionally, the expanded first pump 107 contains a low concentration of carbon dioxide that has not yet been filtered out. Additionally, each of the second capture chambers contains a high concentration of carbon dioxide that is adsorbed to the second adsorbents as well as a low concentration of nitrogen that is incidentally trapped by the second adsorbents.

Returning to FIG. 2, following the performance of operation 212, the method 200 proceeds with the performance of operation 216, wherein gas is moved through the second capture system. In accordance with at least one embodiment of the present disclosure, performance of operation 216 may include the performance of a number of sub-operations.

It may seem counterintuitive that gas is moved out of the second capture system in operation 212 prior to moving through the second capture system in operation 216, but the method 200 is not performed once or even a few times, but continuously over a great number of cycles. Accordingly, for all but the first few performances of the method 200, gas will be present in each pump and each capture chamber of each of the systems from a previous performance of the method 200. Accordingly, the first few performances of the method 200 may not be optimal or logical when considered in isolation, because the system is being filled and equilibrated during those performances of the method 200. However, once each pump and capture chamber is filled with gas, it is efficient to move nitrogen-rich gas out of the second capture system in the performance of operation 212 prior to moving carbon dioxide-rich gas through the second capture system in the performance of operation 216 during the performance of the method 200.

In the performance of operation 216, the first and second valves of each of the second capture chambers are closed, the third valve of each second capture chamber is opened, and the second pump immediately downstream of each of the second capture chambers is expanded. The low pressure generated by the expansion of each of the second pumps desorbs carbon dioxide from the second adsorbent in the immediately upstream second capture chamber and draws the desorbed carbon dioxide from each second capture chamber into the immediately downstream second pump.

Accordingly, at the conclusion of the performance of operation 216, each of the expanded second pumps contains carbon dioxide-rich gas which will be moved out of the second capture system during the next performance of operation 212. In particular, the carbon dioxide-rich gas in each of the second pumps that is immediately upstream of a second capture chamber will be moved through the immediately downstream second capture chamber, into the fourth path, and out of the second capture system during the next performance of operation 212. In contrast, the carbon dioxide-rich gas in the most downstream of the second pumps, which is not arranged immediately upstream of a second capture chamber, will be moved into the second capture system output during the next performance of operation 212.

Figure 7:
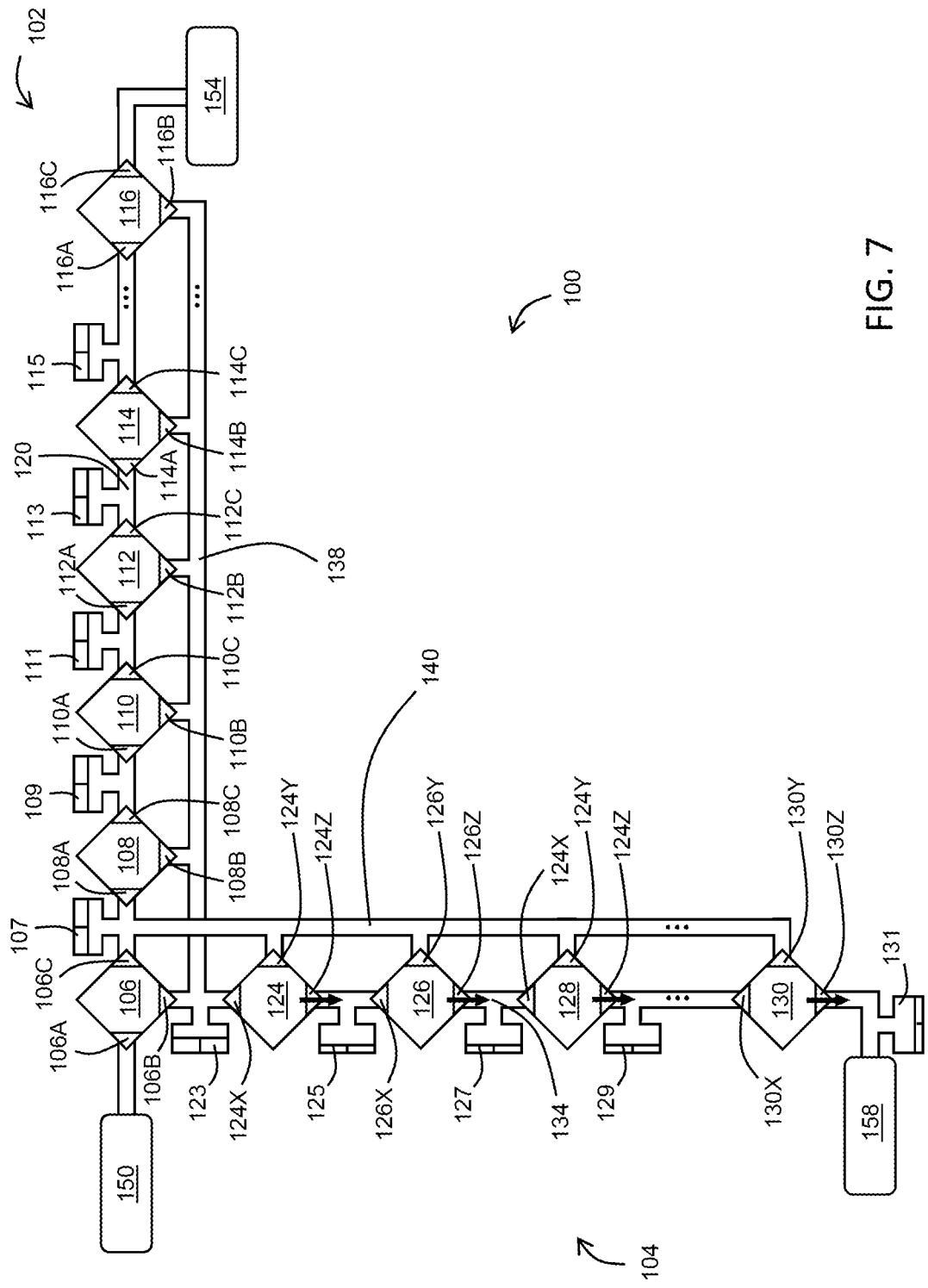
FIG. 7 illustrates the performance of a portion of the method shown in FIG. 2 using the gas separation system shown in FIG. 1, in accordance with some embodiments of the present disclosure.

FIG. 7 illustrates the performance of operation 216 in the context of the gas separation system 100. The arrows shown in FIG. 7 illustrate the movement of gas through the gas separation system 100 during the performance of operation 216.

First, to enable the gas to be moved through the second capture system 104, the first and second valves X and Y of each second capture chamber 124, 126, 128, and 130 are closed, and the third valve Z of each second capture chamber 124, 126, 128, and 130 is opened. Next, to move the gas through the second capture system 104, each of the second pumps 125, 127, 129, and 131 that is arranged immediately downstream of a second capture chamber 124, 126, 128, and 130 is expanded. The low pressure generated by the expansion of each of the second pumps 125, 127, 129, and 131 desorbs carbon dioxide from the second adsorbent in each of the second capture chambers and draws the desorbed carbon dioxide into the corresponding immediately downstream second pump.

At the conclusion of the performance of operation 216, each of the expanded second pumps 125, 127, 129, and 131 contains carbon dioxide-rich gas which will be moved through the second capture system 104 during the next performance of operation 212. In particular, the carbon dioxide-rich gas in each of the expanded second pumps 125, 127, 129 that is immediately upstream of a second capture chamber will be moved through the immediately downstream second capture chamber 126, 128, and 130, where more carbon dioxide will be adsorbed onto the second adsorbent and the resulting gas stream containing less carbon dioxide is moved into the fourth path 140, and out of the second capture system 104 during the next performance of operation 212. In contrast, the carbon dioxide-rich gas in the most downstream of the second pumps 131, which is not arranged immediately upstream of a second capture chamber, will be moved into the second capture system output 158 during the next performance of operation 212.

In this way, the gas separation system 100 performs highly efficient carbon capture. In accordance with embodiments of the present disclosure, the carbon dioxide concentration of gas that is moved into the second capture system output 158 can be, for example, 99.9%. Accordingly, in some embodiments, the carbon dioxide-rich gas in the second capture system output 158 can be repurposed for the production of high-grade carbon dioxide products.

Returning to FIG. 2, following the performance of operation 216, the method 200 repeats by returning to the performance of operation 204.

In accordance with at least one embodiment of the present disclosure, the performance of operation 208 and the performance of operation 216 can be performed concurrently. In other words, gas can be moved out of the first capture system at the same time that gas is moved through the second capture system. This is possible because the performance of operation 208 and the performance of operation 216 do not include any contradictory or interfering operation of any of the pumps or valves of the gas capture system.

As noted above, moving gas out of the first capture system and into the second capture system in the performance of operation 208 includes opening the second valve of each of the first capture chambers, closing the first and third valves of each of the first capture chambers, and expanding a second pump to reduce pressure in a third path which is connected to the second capture system, thereby drawing the carbon dioxide-rich gas from the first capture chambers into the third path and into the second capture system.

As further noted above, moving gas through the second capture system in the performance of operation 216 includes closing the first and second valves of each of the second capture chambers, opening the third valve of each second capture chamber, and expanding the second pump immediately downstream of each of the second capture chambers, thereby desorbing carbon dioxide from the second adsorbent in the immediately upstream second capture chamber and drawing the desorbed carbon dioxide from each second capture chamber into the immediately downstream second pump.

Opening the second valve of each of the first capture chambers, closing the first and third valves of each of the first capture chambers, and expanding the most upstream second pump in the performance of operation 208 does not interfere with or contradict closing the first and second valves of each of the second capture chambers, opening the third valve of each second capture chamber, and expanding the second pump immediately downstream of each of the second capture chambers in the performance of operation 216. Likewise, the performance of operation 216 does not interfere with or contradict the performance of operation 208. Therefore, to optimize efficiency, the two operations can be performed concurrently with one another.

Figure 8:
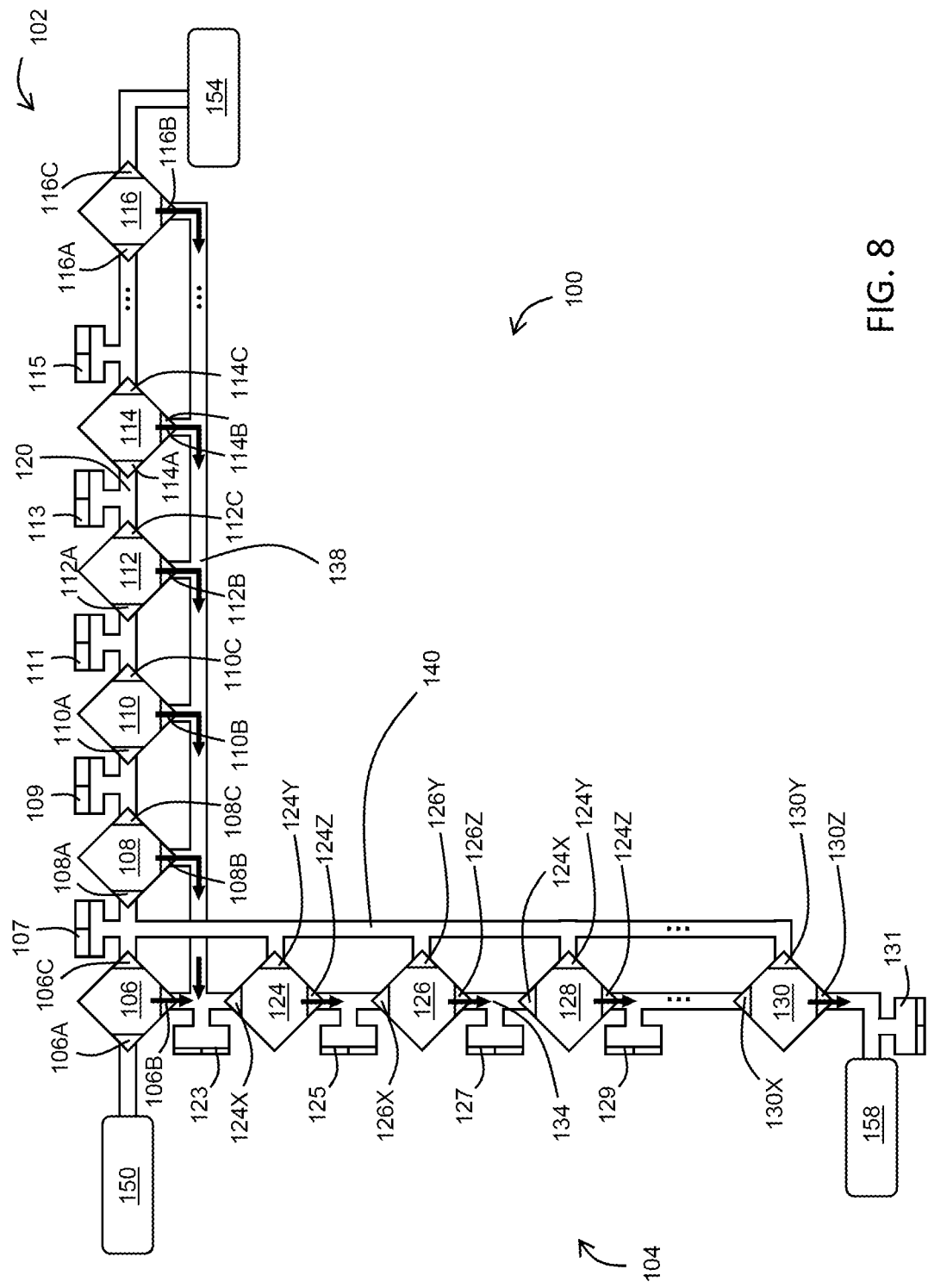
FIG. 8 illustrates the concurrent performance of portions of the method shown in FIG. 2 using the gas separation system shown in FIG. 1, in accordance with some embodiments of the present disclosure.

FIG. 8 illustrates the concurrent performance of operations 208 and 216 in the context of the gas separation system 100. The arrows shown in FIG. 8 illustrate the movement of gas through the gas separation system 100 during the concurrent performance of operations 208 and 216. The performance of each of operations 208 and 216 in the context of the gas separation system 100 has been discussed above and therefore is not restated here.

In accordance with at least one embodiment of the present disclosure, the performance of a portion of operation 204 and the performance of operation 212 can be performed concurrently. In other words, gas can be moved through the first subset of first capture chambers of the first capture system at the same time that gas is moved out of the second capture system. This is possible because the performance of this portion of operation 204 and the performance of operation 212 do not include any contradictory or interfering operation of any of the pumps or valves of the gas capture system.

As noted above, moving gas through the first subset of first capture chambers in the performance of operation 204 includes opening the first and third valves of each first capture chamber and closing all other valves of the first capture system, expanding the first pump arranged immediately downstream of each of the first capture chambers of the first subset and contracting all other first pumps, thereby moving gas through the open valves of the first subset of the first capture chambers, passing it over the first adsorbents therein.

As further noted above, moving gas out of the second capture system in the performance of operation 212 includes closing the second valve of each of the first capture chambers, partially contracted to move gas from each of the second pumps into each of the second capture chambers and to equilibrate pressure within the gas separation system, opening the first and second valves of each of the second capture chambers and closing the third valve of each of the second capture chambers, and further contracting each of the second pumps, thereby moving gas through the respective immediately downstream second capture chamber, and over the second adsorbent therein, and through the fourth path to the first path.

Accordingly, the performance of this portion of operation 204 does not interfere with or contradict the performance of operation 212. Likewise, the performance of operation 212 does not interfere with or contradict the performance of this portion of operation 204. Therefore, to optimize efficiency, the two can be performed concurrently with one another.

Figure 9:
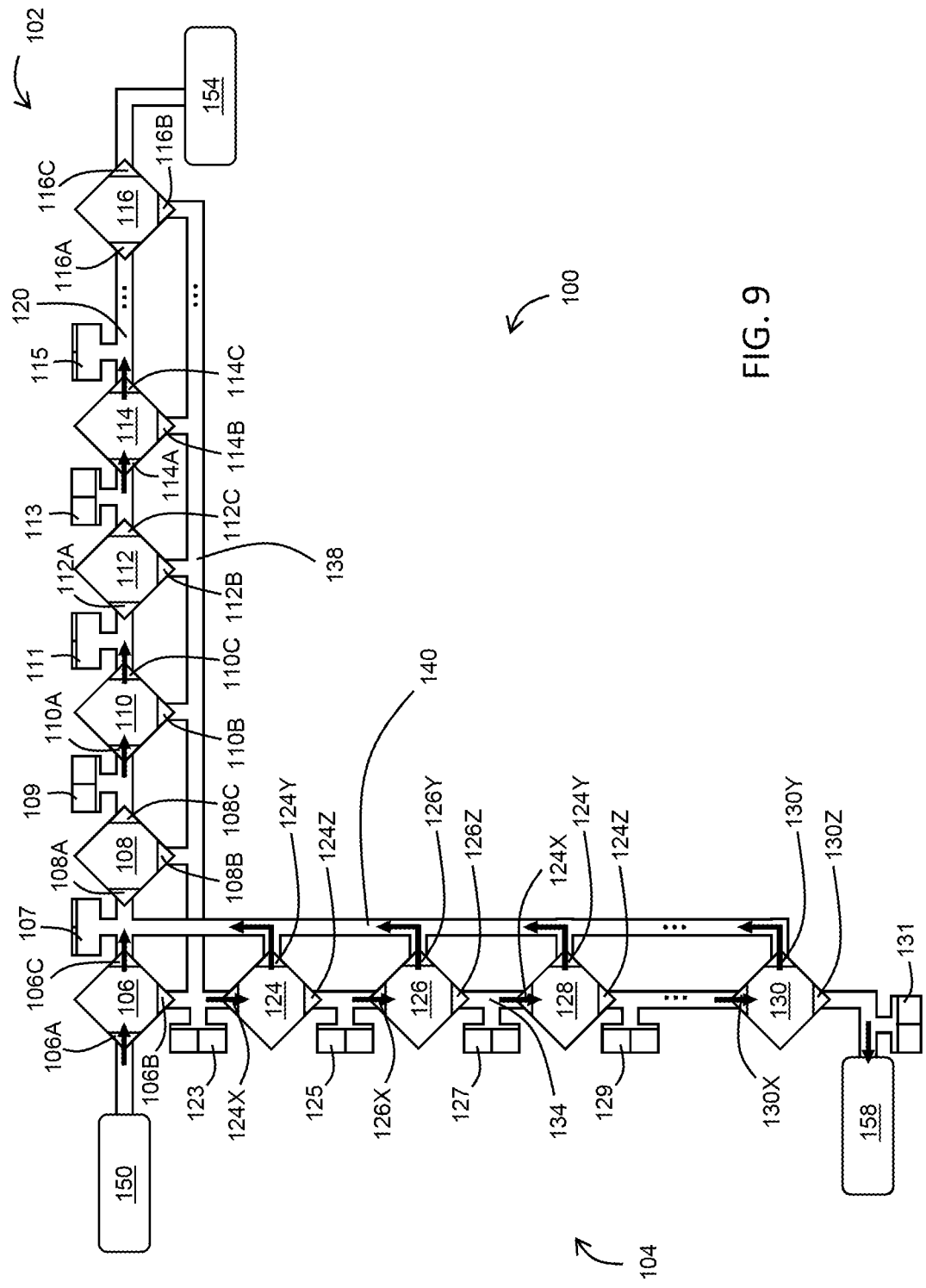
FIG. 9 illustrates the concurrent performance of portions of the method shown in FIG. 2 using the gas separation system shown in FIG. 1, in accordance with some embodiments of the present disclosure.

FIG. 9 illustrates the concurrent performance of this portion of operation 204 and operation 212 in the context of the gas separation system 100. The arrows shown in FIG. 9 illustrate the movement of gas through the separation system 100 during the concurrent performance of this portion of operation 204 and the performance of operation 212. The performance of each of this portion of operation 204 and the performance of operation 212 in the context of the gas separation system 100 has been discussed above and therefore is not restated here.

Regardless of the order in which the operations are performed, the method 200 enables highly efficient separation of $CO_2$ and $N_2$ from gas streams. The number of iterations that any discrete volume of input gas must undergo before producing 99.9% pure $CO_2$ depends, in part, on the pressure at which the method is performed. In particular, at higher pressure, fewer iterations of the method 200 will be needed to reach 99.9% $CO_2$ adsorption in adsorbents, such as MOFs. For example, assuming that the method 200 has already been performed enough times to equilibrate and fill the system, at 4.0 MPa, the MOFs can achieve 99.9% $CO_2$ adsorption after three iterations of the method 200. Conversely, at lower pressure, more iterations of the method will be needed to reach 99.9% $CO_2$ adsorption in MOFs.

Additionally, the number of iterations that any discrete volume of input gas must undergo before producing 99.9% pure $CO_2$ also depends, in part, on the selectivity of the adsorbents used for the performance of the method. For example, assuming that the method 200 has already been performed enough times to equilibrate and fill the system, and assuming that ambient air is used as the gas input, a selectivity of greater than approximately 7.3 is required to produce gas having 99.9% $CO_2$ after six iterations of the method. Conversely, a selectivity of greater than approximately 60 is required to produce gas having 99.9% $CO_2$ after three iterations of the method.

In accordance with one example embodiment of the present disclosure, the method 200 can be performed to directly capture $CO_2$ from air. $CO_2$ typically makes up approximately 0.04% of air. In such embodiments, a gas capture system such as the example gas capture system 100 can enable 99.9% purity $CO_2$ to be reached after seven iterations of the method 200. Fewer iterations can be performed to reach 99.9% purity $CO_2$ if the gas capture system 100 utilizes adsorbents having higher selectivities.

Figure 10:
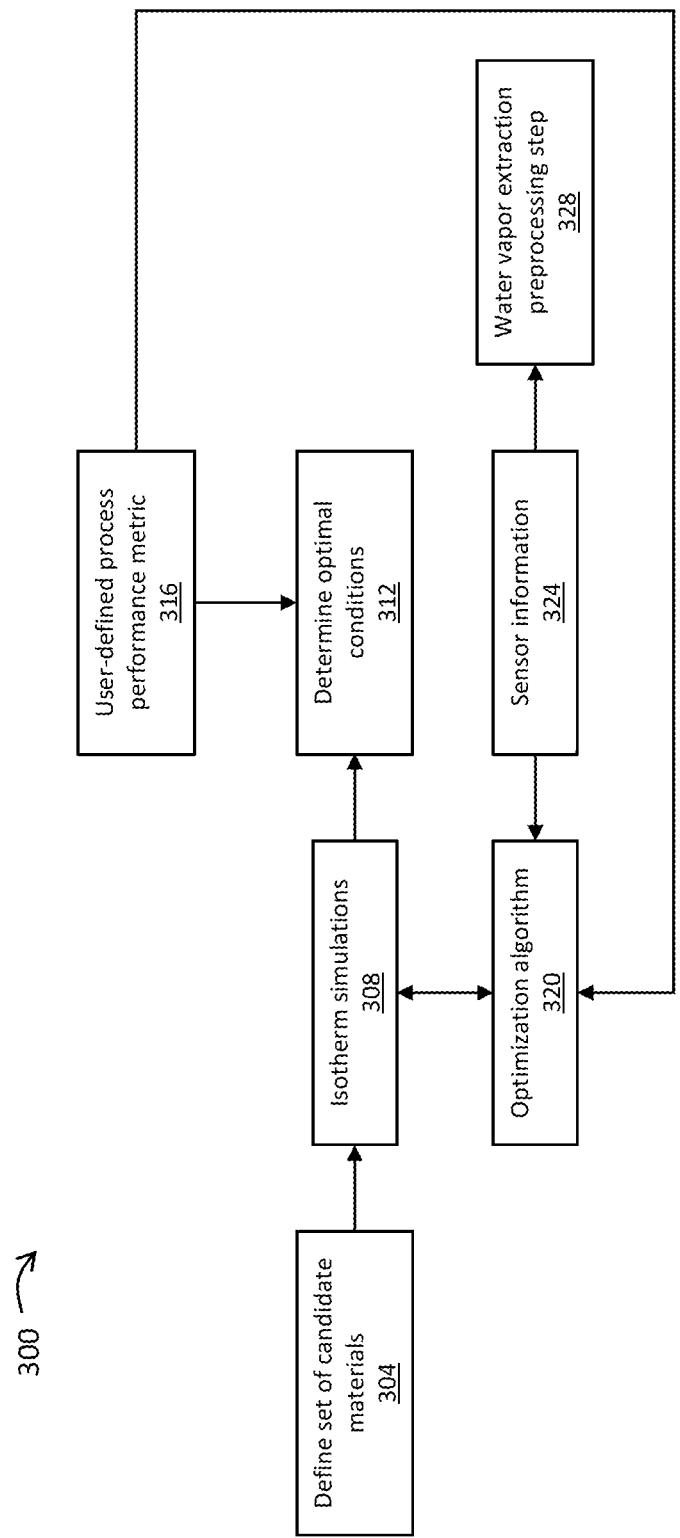
FIG. 10 illustrates an example process for automating the implementation of the method shown in FIG. 2, in accordance with some embodiments of the present disclosure.

It is possible to automate the implementation of the method 200 to optimize the design and operation of a system substantially similar to the gas separation system 100. For example, as shown in FIG. 10, such an automation process 300 may include defining a set of candidate adsorbent materials (such as MOFs) at operation 304, performing isotherm simulations at different pressures and temperatures for different numbers of steps and combinations of the candidate adsorbent materials at operation 308, and determining optimized conditions for the performance of the method 200 at operation 312. Conditions for the performance of the method 200 can include, for example, a number of iterations of the method 200 to perform, which adsorbent materials to use, and related pressures and temperatures for the performance of the method 200. In accordance with at least one embodiment of the present disclosure, the process 300 may be performed by a computer system.

As further illustrated in FIG. 10, the performance of the process 300 may further include using a user-defined process performance metric 316 to determine the optimized conditions at operation 312. More specifically, in accordance with embodiments of the present disclosure, the user-defined process performance metric 316 can provide the objective function which the process 300 seeks to optimize based on, for example, monetary cost, adsorption selectivity, and $CO_2$ loading of adsorbents.

Additionally, the performance of the process 300 may further include using an optimization algorithm 320 to examine the results of the simulations and suggest new efficient configurations and combinations for further isotherm simulations performed at operation 308. In accordance with some embodiments of the present disclosure, the optimization algorithm 320 may be configured based on the user-defined process performance metric 316.

In accordance with some embodiments of the present invention, the optimization algorithm 320 is also configured to receive sensor information 324 from the gas separation system during experimental operation of the gas separation system based on the optimized conditions determined at operation 312. Sensor information 324 can include, for example, real time pressure, temperature, and gas and water vapor composition collected from at least one sensor in the gas separation system.

Such sensor information 324 can also be used to calibrate the operational settings of a water vapor extraction preprocessing step 328, which may be performed prior to the performance of the method 200. The water vapor extraction preprocessing step 328, and calibration thereof, is particularly valuable because variable water vapor levels are known to significantly alter the adsorption performance of adsorptive materials.

Experimental data gathered from the experimental operation of the gas separation system can be compared with isotherm simulations performed at operation 208, and detected divergences can be accounted for in the optimization algorithm 320.

Figure 11:
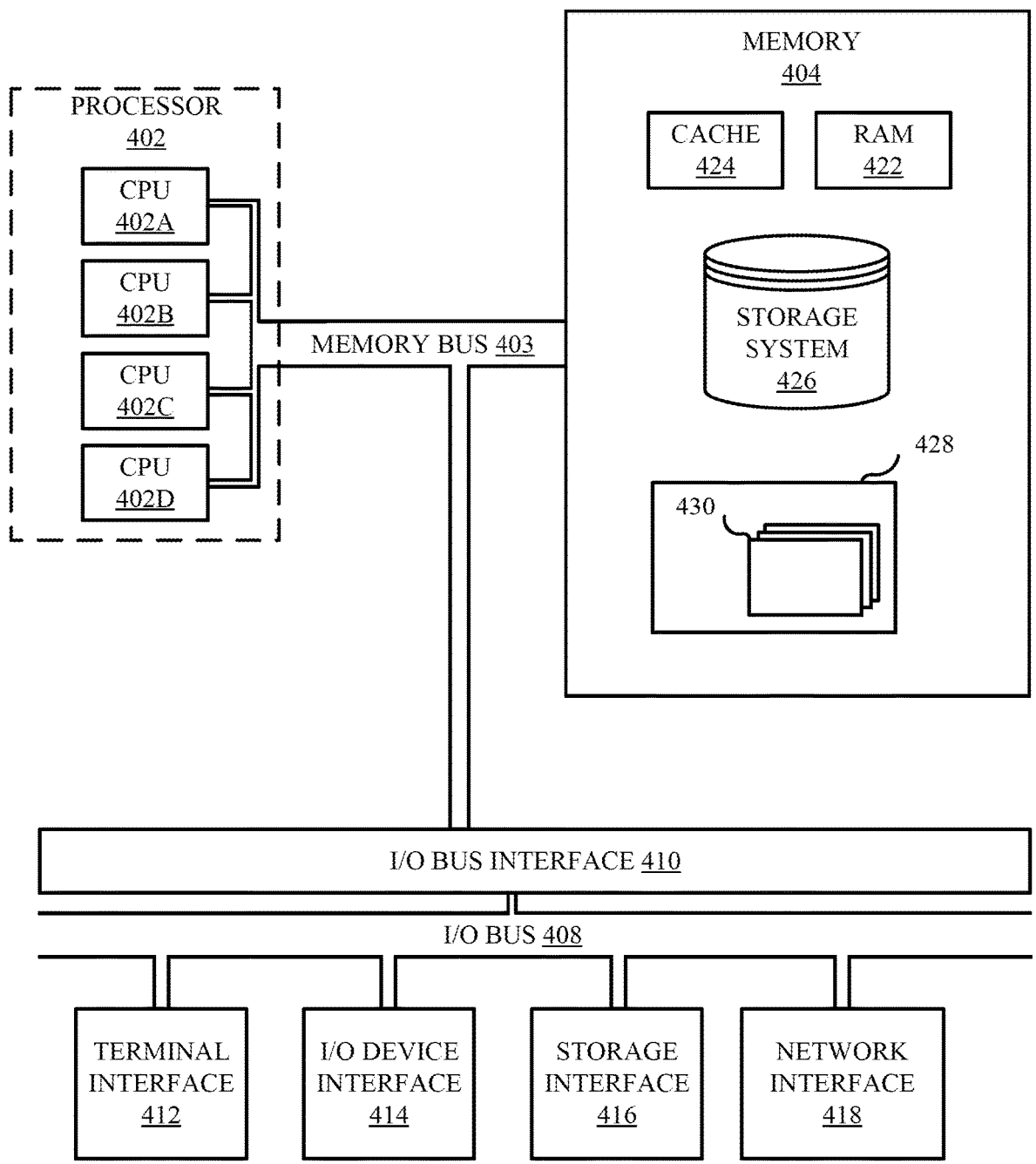
FIG. 11 illustrates a high-level block diagram of an example computer system that may be used in implementing one or more of the methods, tools, and modules, and any related functions, described herein, in accordance with embodiments of the present disclosure.

Referring now to FIG. 11, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 11 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 401. In some embodiments, however, individual components may have greater or lesser complexity than as represented in FIG. 11, components other than or in addition to those shown in FIG. 11 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A gas capture system, comprising:
a first capture system including a plurality of first chambers interconnected by a first path, each first chamber including a first adsorbent;
a second capture system including a plurality of second chambers interconnected by a second path, each second chamber including a second adsorbent;
a third path connecting each first chamber to the second path such that a first output of the first capture system is input into the second capture system; and
a fourth path connecting each second chamber to the first path such that a second output of the second capture system is input into the first capture system.

2. The gas capture system of claim 1, wherein:
the first adsorbent has a higher selectivity than the second adsorbent.

3. The gas capture system of claim 1, wherein:
at least one of the first or second adsorbent removes carbon dioxide from a gas stream that passes through the respective capture system.

4. The gas capture system of claim 1, wherein:
the first capture system includes a plurality of first pumps connected to the first path such that a first pump is arranged between each of the first chambers; and
the second capture system includes a plurality of second pumps connected to the second path such that a second pump is arranged between each of the second chambers.

5. The gas capture system of claim 4, wherein:
the third path is connected to the second path such that the first output moves into a second pump of the plurality of second pumps.

6. The gas capture system of claim 4, wherein:
the fourth path is connected to the first path such that the second output moves into a first pump of the plurality of first pumps.

7. The gas capture system of claim 1, wherein:
the first capture system further includes a third output configured to move nitrogen-rich gas out of the gas capture system.

8. The gas capture system of claim 1, wherein:
the second capture system further includes a fourth output configured to move carbon-rich gas out of the gas capture system.

9. A gas capture system, comprising:
a first capture system including a plurality of first capture chambers, each first capture chamber including a first gas capture medium configured to capture molecules of a gas species;
a second capture system including a plurality of second capture chambers, each second capture chamber including a second gas capture medium configured to capture molecules of the gas species;
a first path configured to move a first output of the first capture system into the second capture system; and
a second path configured to move a second output of the second capture system into the first capture system.

10. The gas capture system of claim 9, wherein:
the first capture system includes a plurality of first pumps, each first pump arranged immediately downstream of a corresponding first capture chamber; and
one first pump of the plurality of first pumps is open to the second path.

11. The gas capture system of claim 9, wherein:
the second capture system includes a plurality of second pumps, each second pump arranged immediately upstream of a corresponding second capture chamber; and
one second pump of the plurality of second pumps is open to the first path.

12. The gas capture system of claim 9, wherein:
the gas species is carbon-dioxide.

13. The gas capture system of claim 9, wherein:
the first output includes the molecules of the gas species that were captured by the first gas capture medium in each of the first capture chambers.

14. The gas capture system of claim 9, further comprising:
a system output configured to receive the molecules of the gas species that were captured by the second gas capture medium in each of the second capture chambers.

* * * * *